United States Patent [19]

Hartshorn et al.

[11] Patent Number: 5,547,240

[45] Date of Patent: Aug. 20, 1996

[54] HAND-HELD TROWEL WITH AN ACCESSIBLE HOLLOW HANDLE COMPARTMENT

[76] Inventors: Gordon K. Hartshorn, P.O. Box 338, Rollinsville, Colo. 80474; Karen A. Pyrtek, 50 Martins View Rd., Lake Hopatcong, N.J. 07849

[21] Appl. No.: 369,745

[22] Filed: Jan. 6, 1995

[51] Int. Cl.⁶ .................................................. A01B 1/02
[52] U.S. Cl. ................................................ 294/49; 294/57
[58] Field of Search .............................. 294/1.3, 49, 51, 294/55, 57, 59; 7/114, 116, 167; 15/257.1, 257.7; 16/110.5; 30/125; 81/177.4, 490; 172/371, 375, 380, 381; D8/10

[56] References Cited

U.S. PATENT DOCUMENTS

| | | |
|---|---|---|
| 108,596 | 10/1870 | Hundley . |
| D. 198,533 | 6/1964 | Langlie et al. . |
| 209,359 | 10/1878 | Rahner . |
| 441,135 | 11/1890 | Cleves .................................. 294/49 |
| 912,411 | 2/1909 | Putney . |
| 1,003,119 | 9/1911 | Mondragon ...................... 294/51 X |
| 1,309,281 | 7/1919 | Forbes ............................... 81/490 |
| 1,321,055 | 11/1919 | Kingsbury ............................ 294/49 |
| 1,403,281 | 1/1922 | Anover . |
| 1,983,815 | 12/1934 | Schmiett ......................... 294/49 X |
| 2,605,545 | 8/1952 | Weems . |
| 3,255,524 | 6/1966 | Clendenon, Jr. . |
| 4,424,997 | 1/1984 | Jackson ........................... 294/55 X |
| 5,095,573 | 3/1992 | Henke et al. ..................... 294/55 X |

*Primary Examiner*—Johnny D. Cherry
*Attorney, Agent, or Firm*—Donald W. Margolis; Emery L. Tracy

[57] ABSTRACT

The present invention is a hand-held trowel for digging and carrying standard sized personal hygiene products. The trowel comprises a blade assembly having a blade suitable for digging. The blade has a digging end and a handle end. A handle assembly is connected to the blade, and in preferred embodiments includes a substantially semi-cylindrical lower portion mounted to the blade assembly. In addition, a substantially semi-cylindrical upper portion is hingedly connected to the lower portion with the upper and lower portions defining a substantially cylindrical compartment which has a length equal to at least the length of a standard-sized piece of toilet tissue.

19 Claims, 2 Drawing Sheets

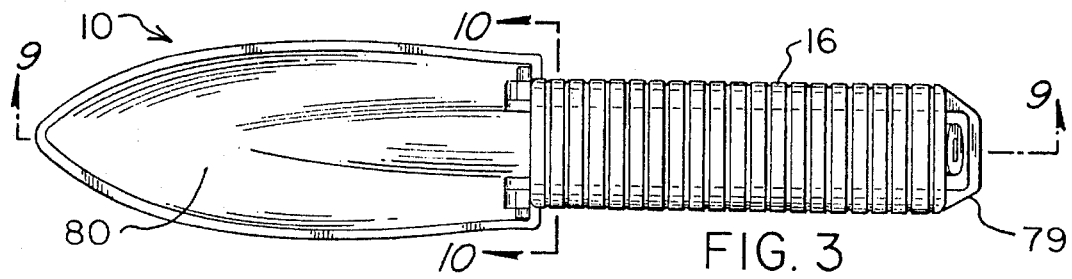
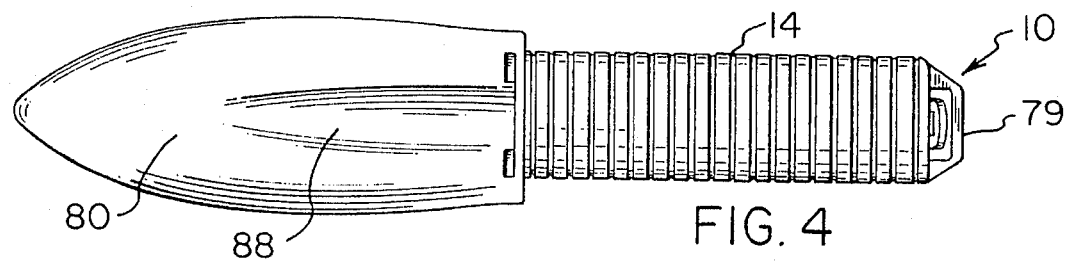
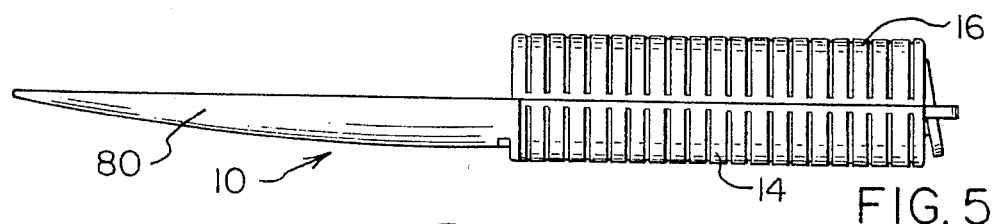
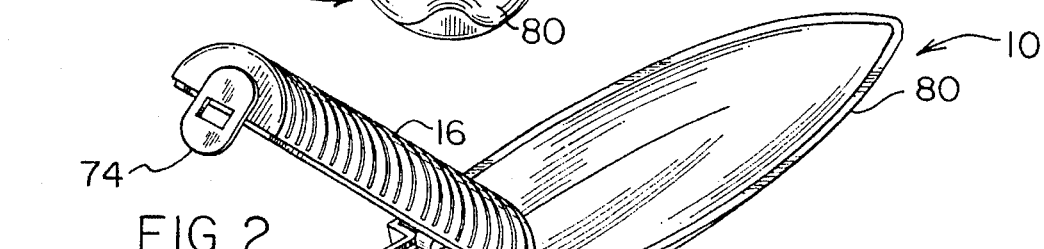
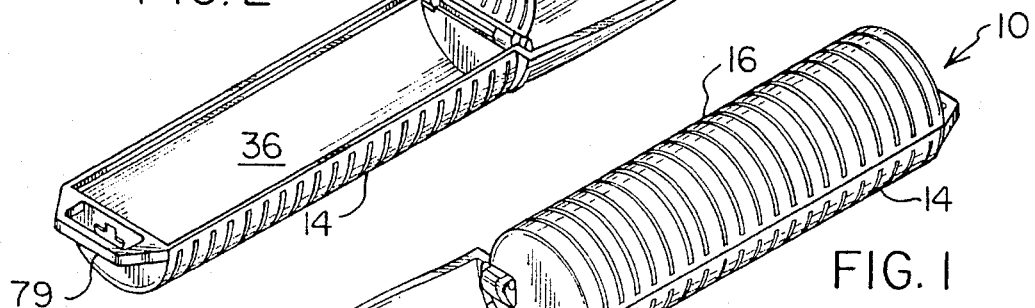
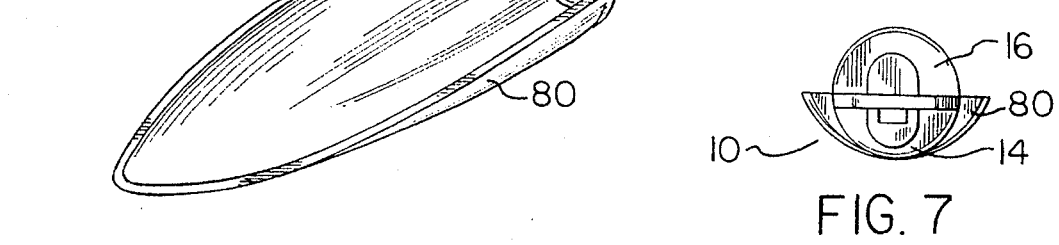

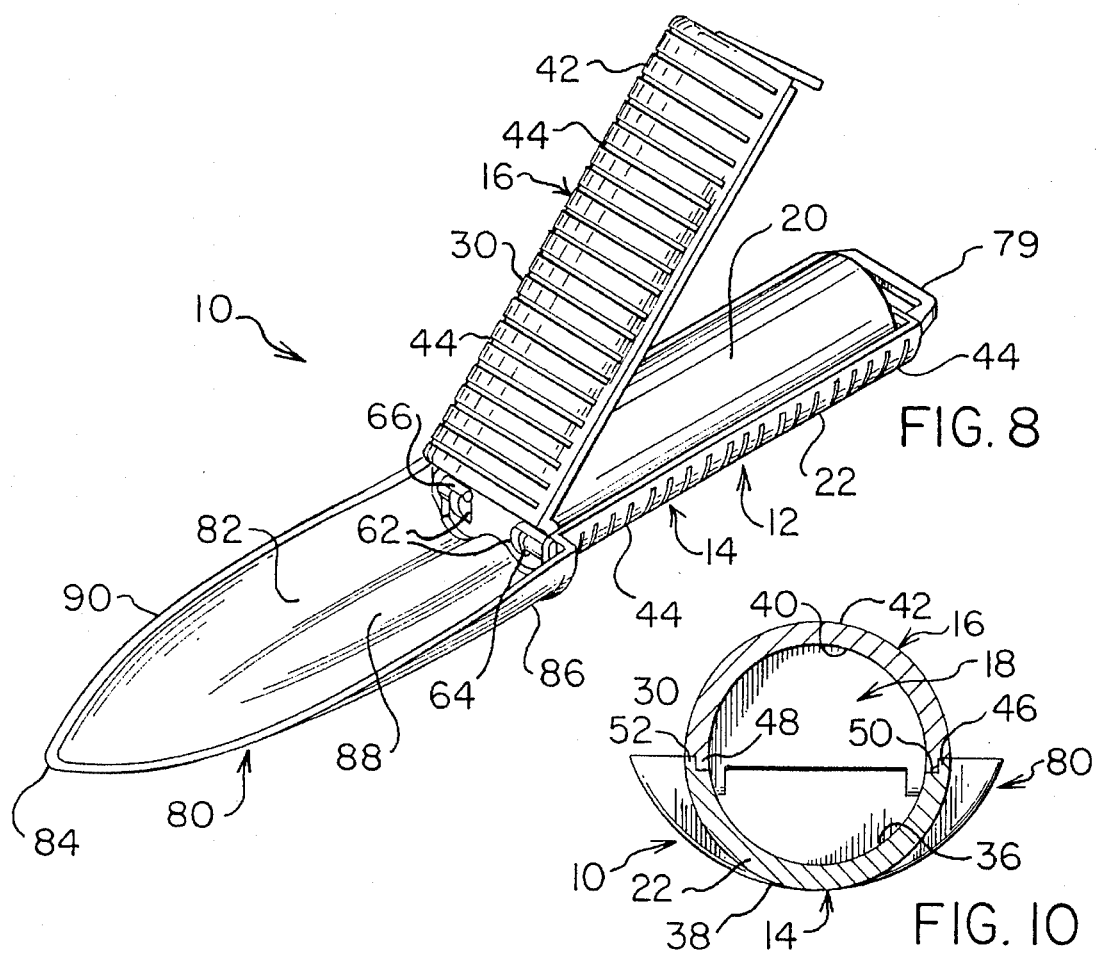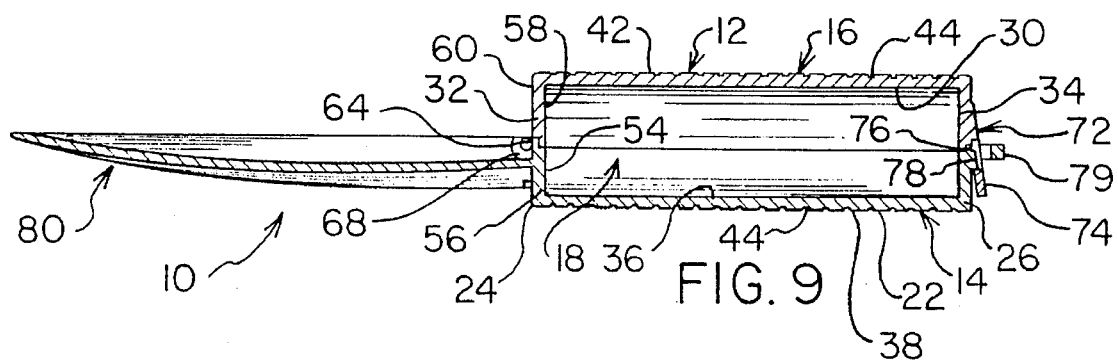

5,547,240

HAND-HELD TROWEL WITH AN ACCESSIBLE HOLLOW HANDLE COMPARTMENT

RELATED MATTERS

The present invention was the subject of Disclosure Document No. 334443, filed Jul. 1, 1993, and titled "INVENTION DESCRIPTION", and of U.S. Design Patent application Ser. No. 29/017,212, filed Jan. 7, 1994 and now abandoned.

BACKGROUND OF THE INVENTION

1. Field of the Invention:

The present invention relates to hand-held tools, and in particular, it relates to hand-held trowels having an accessible hollow handle compartment.

2. Discussion of the Prior Art:

Today, people frequently travel to the woods, mountains or other "wild" or unimproved areas for recreational purposes, or merely to escape the urban environment. Due to the lack of improvements in these areas, comfort facilities, including toilets, are generally not available. However, humanity being what it is, the need for toilet facilities in unimproved areas exists.

When returning to nature, in the absence of restroom facilities, it is an usually the desire of hikers and backpackers in the back country not to harm or otherwise impact the environment. Therefore, in order to carry out their normal eliminatory functions without adversely affecting the environment, people should carry equipment to dig a small latrine, and also to carry the necessary accessories to clean themselves after the completion of their functions. Previously, this has proved to be cumbersome, since many camper shovels are large and not convenient to carry, but are also impractical since the other accessories, such as toilet paper, are generally necessary when a person completes the use of a latrine or restroom.

Clendenon, Jr., U.S. Pat. No. 3,255,524, describes a utility knife and digging tool having an inner cavity or compartment for the temporary attachment of an extension which facilitates use of the knife as a digging tool. While capable of carrying small articles at times other than when the extension is mounted on the knife, the compartment of the Clendenon, Jr., patent is neither large enough or accessible enough to carry personal hygiene products, such as toilet paper, which are generally necessary for sanitation and comfort. In fact, carrying the utility knife inside or outside of a backpack or pocket poses hazardous problems in that the knife blade could cause injuries or damage to the person or the belongings of the carrier.

SUMMARY OF THE INVENTION

It is therefore an object of the present invention to provide a hand-held trowel having an easily accessible hollow handle compartment.

It is a further object of the present invention to provide such a hand-held trowel having an easily hollow handle compartment which is of sufficient sized to carry desired and necessary personal hygiene products, such as a substantial supply of toilet paper in a roll, and without the need for folding or otherwise wadding the toilet paper or other products.

It is a yet a further object of the present invention to provide a lightweight hand-held trowel having an easily hollow handle compartment which can be easily, efficiently and safely carried by a person while hiking, camping or otherwise away from normal toilet facilities.

The present invention is a hand-held trowel comprising a blade assembly which is suitable for digging in the ground. The blade includes a digging end and a handle end with a handle assembly mounted to the handle end of the blade assembly. In preferred embodiments the blade is scoop-shaped, with a strengthening rib extending along at least a portion of the blade from the handle end towards the digging end, and also preferably includes a flat edge around at least a portion of the circumference of the blade.

The handle assembly includes a hollow, easily accessible compartment which is defined by swingably connected upper and lower substantially concave portions, preferably semi-cylindrical in shape. In preferred embodiments, the compartment is sized to carry a substantial quantity of standard-sized toilet tissue in a conveniently useable roll form. Furthermore, the upper and lower portions of the handle can include mating inner and outer lips which are sized to fit about one another to provide a secure fit between the portions, thereby substantially sealing the compartment from the entry of liquids, dirt, or other materials.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 1 is a top perspective view of the hand-held trowel with an accessible hollow handle compartment;

FIG. 2 is a top perspective view reversed 180° with the compartment lid in an opened position;

FIG. 3 is a top plan view of FIG. 1;

FIG. 4 is a bottom plan view of FIG. 1;

FIG. 5 is a left side elevational view thereof, the right side elevational view not being shown, but being a mirror image of the left side view;

FIG. 6 is a front elevational view of FIG. 1;

FIG. 7 is a rear elevational view of FIG. 1;

FIG. 8 is a top, front opposite side perspective view with the compartment lid in an open position;

FIG. 9 is a sectional view of the hand-held trowel according to the present invention taken along line 9—9 in FIG. 3; and FIG. 10 is a sectional view of the hand-held trowel according to the present invention taken along line 10—10 in FIG. 3.

DETAILED DESCRIPTION OF THE PREFERRED EMBODIMENTS

As illustrated in FIGS. 1–10, the present invention is a hand-held trowel indicated generally at 10. As detailed below, in preferred embodiments, the design and construction of the hand-held trowel 10 with an accessible hollow handle compartment 18 of the present invention permits the user to insert a roll of toilet tissue in the compartment. Trowel 10 can then be used by an outdoorsperson to dig a small latrine in the ground, and then, after its use, provide the user with a convenient and sanitary source of toilet tissue.

Now referring to FIGS. 1–10, the trowel 10 of the present invention includes a substantially cylindrical handle assembly 12, although a handle of square, rectangular or other cross sectional shapes can be used. In this preferred embodiment, handle assembly 12 includes a semi-cylindrical lower portion 14 and a semi-cylindrical upper portion 16 hingedly connected, as detailed below, to the lower portion 14 which, when closed together, form a closed compartment 18 for storing items such as a roll of toilet tissue 20, although it may carry other items such as first aid supplies, matches, smaller tools, and the like. Lower portion 14 and upper portion 16 are easily formed from plastic material, but other workable or formable materials such as metal, composite fibers, wood, and the like, are within the scope of the present invention.

As shown, lower portion 14 of the handle includes a lower semi-cylindrical body 22, a lower front end plate 24 and a lower back end plate 26 with lower front end plate 24 and lower back end plate 26 being connected to and integral with lower body 22 at opposed ends of lower semi-cylindrical body 22. While lower back end plate 26 preferably has a width about the same as the width of lower semi-cylindrical body 22, lower front end plate 24 is preferably larger than the width of lower body 22 in order to provide stability and support for a blade assembly 80, as described below.

Upper portion 16 of the handle includes an upper semi-cylindrical body 30, an upper front end plate 32 and an upper back end plate 34. Upper front end plate 32 and upper back end plate 34 are connected to upper body 30 at opposed ends of upper cylindrical body 30. Preferably, upper front end plate 32 and upper back end plate 34 each have a profile which is approximately equal to the cross-sectional profile of the portion of upper body 30 to which they are connected. While lower front end plate 24, lower back end plate 26, upper front end plate 32 and upper back end plate 34 are preferably integrally formed with lower semi-cylindrical body 22 and upper semi-cylindrical body 30,, respectively, they may also be connected to lower semi-cylindrical body 22 and upper semi-cylindrical body 30 by adhesive, fusion, mechanical connectors, or by other means.

Lower body 22 includes a lower inner surface 36 and a lower outer surface 38. Upper body 30 includes an upper inner surface 40 and an upper outer surface 42. Inner surfaces 36, 40 are preferably substantially smooth to facilitate storage of items within compartment 18. Outer surfaces 38, 42 each include a plurality of circumferential grooves 44 formed there-around, substantially at right angles to the longitudinal axis of handle assembly 12. Grooves 44 provide a grip on handle assembly 12 to assist a user of the hand-held trowel when using it to dig.

Lower body 22, lower front end plate 24 and lower back end plate 26 form a lower outer lip 46 about the perimeter of lower portion 14. Upper body 30, upper front end plate 32 and upper back end plate 34 form an upper inner lip 48 about the perimeter of upper portion 16. Lower outer lip 46 includes a first shoulder 50 on lower inner surface 36 side of lower body 22. Upper inner lip 48 includes a second shoulder 52 on upper outer surface 42 side of upper body 30.

First shoulder 50 and second shoulder 52 are formed such that lower outer lip 46 matingly connects to upper inner lip 48 by virtue of lower outer lip 46 contacting second shoulder 52 and upper inner lip 48 contacting first shoulder 50. This mating relationship serves to seal lower portion 14 to upper portion 16, and to thereby secure and protect any item within compartment 18 by discouraging liquids, dirt or other materials from entering compartment 18 between lower outer lip 46 and upper inner lip 48.

Lower front end plate 24 of lower body 22 includes an inner side 54 facing the compartment 18 and an opposite facing outer side 56. Upper front end plate 32 of upper body 30 includes an inner side 58 facing the compartment 18 and an opposite facing outer side 60. Lower body 22 further includes a pair of spaced-apart notches 62 formed or cut into lower front end plate 24. Lower front end wall notches 62 assist the hinge connection of upper portion 16 to lower portion 14, as detailed below.

A plurality of mounting brackets 66 are secured to outer side 56 of lower front end plate 24 on each side of notches 62 with a pin 64 secured between each pair of mounting brackets 66 and spanning each of notches 62. Upper body 30 further includes a pair of spaced, U-shaped fingers 68 extending from the upper edge of the upper front end wall in a generally downward direction from upper front end plate 32 away from upper inner surface 40 of upper body 30. Each finger 68 includes an opening for rotatably receiving one of pins 64 of upper body 30. The rotatable reception of pins 64 in the openings allows upper body 30 to pivot about pins 64 thereby hingedly connecting upper body 30 to lower body 22. This allows upper body 30 and lower body 22 to be hingedly closed together to form compartment 18.

Mounted on the upper and lower back end plates 26, 34 of the lower and upper bodies 22, 30 is an easily releasable latch mechanism 72 to maintain compartment 18 in a closed state when desired. In a preferred embodiment, latch mechanism 72 includes a plate 74 having an aperture 76 therein with plate 74 being mounted by a screw or other means on upper back end plate 34 of upper body 30. The aperture 76 is designed and shaped to receive a protrusion 78 formed on lower back end plate 26 of lower body 22 such that a user can urge plate 74 away from protrusion 78, thereby releasing upper body 30 so that upper body 30 can pivot freely away from lower body 22. The latch mechanism 72 further includes a substantially U-shaped ring 79 mounted to lower body 22 over protrusion 78. U-shaped ring 79 may be used to secure trowel 10 to a lanyard or to a clip so that it may either be easily retrieved and/or secured to a pack or belt. U-shaped ring 79 also serves as a protective guard to hinder accidental release of plate 74 from protrusion 78.

Trowel 10 of the present invention 10 further includes a blade assembly 80. Blade assembly 80 is preferably integrally formed on outer side 56 of lower front end plate 24, although it may be connected by other means. The blade assembly 80 includes a scoop-shaped blade 82 having a tip end 84 and an opposed rear end 86. A rib 88 extends along at least a portion of blade 82 from rear end 86 toward the tip end 84. Rib 88 provides additional strength to blade 82 especially for those instances where trowel 10 is being used in rocky or rough terrain. Similarly, flat edge 90 around the circumference of blade 82 assists the user while digging in rough or rocky terrain. While blade 82 is described as being scoop-shaped, it is within the scope of the present invention to have a blade which is flat or sharpened.

In preferred embodiments, the design and construction of the compartment 18 of the hand-held trowel with an accessible hollow handle compartment 10 of the present invention permits the user to insert a roll of about 30 feet, i.e. about 80 sheets of standard-sized toilet tissue 20 in compartment 18 without the need to fold or wad the paper. With such a roll of toilet tissue 20 in compartment 18 of trowel 10, a hiker or camper is provided with a self contained wilderness sanitation kit. Trowel 10 can be used to dig a small latrine or sanitation hole in the ground, and then after its use, provide the user with a convenient and sanitary source of toilet tissue 20 to clean themselves. A user of the hand-held trowel with an accessible hollow handle compartment 10 of the present invention would either place a pre-packaged roll of toilet tissue 20 within compartment 18, or make his or her own short roll of toilet tissue from a standard toilet tissue roll. Incidentally, because of the hollow nature and tight fit of handle compartment 18, trowel 10 will float if it should fall into the water.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

We claim:

1. A hand-held trowel useful for both digging a latrine in the ground and conveniently and accessibly carrying a plurality of toilet tissues in a roll, comprising:

a blade assembly having a blade suitable for digging, said blade assembly having a digging tip end and an opposed rear handle end; and a substantially cylindrical handle assembly having a front end portion connected to said rear handle end of the blade assembly, said handle assembly defining a substantially hollow cylindrical compartment comprised of mating upper and lower substantially semi-cylindrical hollow portions which are hingedly connected together at said front end of said handle assembly, said substantially hollow cylindrical compartment of said handle assembly being sized and adapted to carry a plurality of toilet tissues in a roll, and wherein said handle assembly includes an anterior portion opposed to said front end portion of said handle assembly; whereby said trowel may be used for both digging a latrine in the ground and for carrying for easy access a plurality of toilet tissues in a roll within said hollow cylindrical compartment of said handle assembly of said trowel.

2. The trowel of claim 1 wherein said blade has a circumference, and wherein said rear handle end of said blade is adapted for connection to said handle assembly front end portion.

3. The trowel of claim 2 wherein the blade includes a flat edge around at least a portion of said circumference of the blade.

4. The trowel of claim 1 wherein said blade includes a rib extending along at least a portion of the blade from the rear handle end of said blade towards said digging tip end of said blade.

5. The trowel of claim 1 wherein said opposed rear handle end of said blade is connected to said lower substantially semi-cylindrical hollow portion of said front end portion of said handle assembly.

6. The trowel of claim 1 wherein said lower substantially semi-cylindrical portion of said handle assembly includes a lower outer lip about the perimeter of the upper portion and the upper substantially semi-cylindrical portion of said handle assembly includes an upper inner lip about the perimeter of the lower portion, the lower lip mateable to the upper lip thereby substantially sealing the compartment from the entry of liquids or other materials.

7. The trowel of claim 1 wherein said upper semi-cylindrical portion of said handle assembly and said lower semi-cylindrical portion of said handle assembly each have an inside surface, said inside surfaces being substantially smooth and concave.

8. The trowel of claim 1 wherein said upper semi-cylindrical portion of said handle assembly and said lower semi-cylindrical portion of said handle assembly each have an outside surface, said outside surfaces having a plurality of circumferential grooves, the grooves being substantially at right angles to a longitudinal axis of the handle assembly.

9. The trowel of claim 1 further including a releasable latch mounted on the anterior portion of said handle assembly.

10. The trowel of claim 1 further including a U-shaped ring mounted to the handle assembly.

11. A hand-held trowel comprising:

a blade assembly having a blade suitable for digging, the blade having a digging tip end and a rear handle end; and a handle assembly comprising:
    a substantially semi-cylindrical lower portion connected to said rear handle end of said blade assembly;
    a substantially semi-cylindrical upper portion hingedly connected to the substantially semi-cylindrical lower portion, the substantially semi-cylindrical upper and lower portions defining a substantially cylindrical compartment, the compartment being sized and adapted to carry a plurality of toilet tissues in a roll, and wherein said handle assembly includes an anterior portion opposed to said front end portion of said handle assembly; whereby said trowel may be used for both digging a latrine in the ground and for carrying for easy access a plurality of toilet tissues in a roll within said hollow cylindrical compartment of said handle assembly of said trowel.

12. The trowel of claim 11 wherein the substantially cylindrical compartment has a diameter equal to at least the width of approximately an 80-sheet roll of toilet tissue.

13. The trowel of claim 12 wherein the blade includes a flat edge around at least a portion of the circumference of the blade.

14. The trowel of claim 11 wherein the blade includes a rib extending along at least a portion of the blade from the handle end to the digging tip end.

15. The trowel of claim 11 wherein the blade is mounted to the lower semi-cylindrical portion.

16. The trowel of claim 11 wherein the lower portion includes a lower outer lip about the perimeter of the upper portion and the upper portion includes an upper inner lip about the perimeter of the lower portion, the lower lip mateable to the upper lip thereby substantially sealing the compartment from the entry of liquids or other materials.

17. The trowel of claim 11 and further including a releasable latch mounted on the handle assembly.

18. The trowel of claim 11 and further including a U-shaped ring mounted to the handle assembly.

19. A hand-held trowel useful for both digging a latrine in the ground and conveniently and accessibly carrying a plurality of toilet tissues, in a roll, comprising:

a blade assembly having a blade suitable for digging, said blade assembly having a digging tip end and an opposed rear handle end; and a substantially cylindrical handle assembly having a front end portion connected to said rear handle end of the blade assembly, said handle assembly defining a substantially hollow cylindrical compartment comprised of mating upper and lower substantially semi-cylindrical hollow portions which are hingedly connected together at said front end of said handle assembly, said substantially hollow cylindrical compartment of said handle assembly being sized and adapted to carry a plurality of toilet tissues in a roll, and wherein said handle assembly includes an anterior portion opposed to said front end portion of said handle assembly, said cylindrical handle assembly further including a U-shaped ring mounted on said anterior portion of said cylindrical handle assembly; whereby said trowel may be used for both digging a latrine in the ground and for carrying for easy access a plurality of toilet tissues in a roll within said hollow cylindrical compartment of said handle assembly of said trowel.

* * * * *